United States Patent
Ajila et al.

(10) Patent No.: US 11,500,661 B2
(45) Date of Patent: Nov. 15, 2022

(54) PERFORMING AN APPLICATION SNAPSHOT USING PROCESS VIRTUAL MACHINE RESOURCES

(71) Applicant: International Business Machines Corporation, Armonk, NY (US)

(72) Inventors: Oluwatobi Ajila, Ottawa (CA); Daniel Heidinga, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 43 days.

(21) Appl. No.: 17/002,899

(22) Filed: Aug. 26, 2020

(65) Prior Publication Data
US 2022/0066805 A1    Mar. 3, 2022

(51) Int. Cl.
*G06F 9/455* (2018.01)
*G06F 11/30* (2006.01)
*G06F 11/36* (2006.01)

(52) U.S. Cl.
CPC ...... *G06F 9/45504* (2013.01); *G06F 9/45558* (2013.01); *G06F 11/301* (2013.01); *G06F 11/3636* (2013.01); *G06F 2009/45591* (2013.01); *G06F 2009/45595* (2013.01); *G06F 2201/84* (2013.01); *G06F 2201/86* (2013.01)

(58) Field of Classification Search
CPC ............. G06F 9/45504; G06F 9/45558; G06F 11/301; G06F 11/3636; G06F 2009/45591; G06F 2009/45595; G06F 2201/84; G06F 2201/86
See application file for complete search history.

(56) References Cited

U.S. PATENT DOCUMENTS

| | | | | |
|---|---|---|---|---|
| 9,524,389 B1 * | 12/2016 | Roth | .................... | G06F 9/45533 |
| 10,353,731 B2 * | 7/2019 | Roth | ..................... | G06F 9/4868 |
| 10,402,302 B1 * | 9/2019 | Ramraz | ............... | G06F 11/3664 |
| 11,188,364 B1 * | 11/2021 | Sundaresan | ........... | G06F 16/128 |
| 2007/0083645 A1 * | 4/2007 | Roeck | ................. | G06F 11/2028 |
| | | | | 709/224 |
| 2008/0155169 A1 * | 6/2008 | Hiltgen | ................. | G06F 9/5077 |
| | | | | 711/6 |
| 2008/0184225 A1 * | 7/2008 | Fitzgerald | ........... | G06F 9/45558 |
| | | | | 718/1 |

(Continued)

OTHER PUBLICATIONS

Nisbet et al., "Profiling and Tracing Support for Java Applications", Proceedings of the 2019 ACM/SPEC International Conference on Performance Engineering; Apr. 2019.

(Continued)

*Primary Examiner* — Benjamin C Wu
(74) *Attorney, Agent, or Firm* — Garg Law Firm, PLLC; Rakesh Garg; Michael O'Keefe

(57) ABSTRACT

A snapshot handler is registered with an event monitoring subsystem of a process virtual machine, the registering specifying a trigger event of the snapshot handler, wherein the trigger event comprises execution of a specified portion of an application executing in the process virtual machine, the trigger event specified externally from a source code of the application. Responsive to the event monitoring subsystem detecting an occurrence of the trigger event, the snapshot handler is executed, storing data of an execution state of the process virtual machine at a time of occurrence of the trigger event.

25 Claims, 10 Drawing Sheets

(56) References Cited

U.S. PATENT DOCUMENTS

| | | | |
|---|---|---|---|
| 2011/0126172 | A1 | 5/2011 | Lakshminarayanachar et al. |
| 2014/0351650 | A1* | 11/2014 | Elias ............... G06F 11/362 714/38.1 |
| 2015/0052403 | A1* | 2/2015 | Garrett ............ G06F 11/366 714/38.11 |
| 2015/0143362 | A1 | 5/2015 | Lukacs et al. |
| 2015/0220421 | A1* | 8/2015 | Romer ............ G06F 11/3612 714/38.1 |
| 2015/0324219 | A1* | 11/2015 | Fitzgerald ........ G06F 9/4856 718/1 |
| 2015/0378771 | A1* | 12/2015 | Tarasuk-Levin .... G06F 9/45558 718/1 |
| 2015/0378831 | A1* | 12/2015 | Tarasuk-Levin .... G06F 11/1446 714/15 |
| 2016/0026546 | A1* | 1/2016 | Ljubuncic ........ G06F 11/1451 714/19 |
| 2017/0090688 | A1 | 3/2017 | Anderson et al. |
| 2018/0060104 | A1* | 3/2018 | Tarasuk-Levin ...... G06F 9/4856 |
| 2018/0113999 | A1* | 4/2018 | Azmat ............ G06F 21/105 |
| 2018/0246753 | A1 | 8/2018 | Armitage et al. |
| 2018/0276085 | A1* | 9/2018 | Mitkar ............ G06F 11/1469 |
| 2018/0293374 | A1* | 10/2018 | Chen ............... G06F 9/45558 |
| 2019/0179710 | A1 | 6/2019 | Derryberry |
| 2020/0050516 | A1* | 2/2020 | Alsalim ............ G06F 16/128 |
| 2020/0218553 | A1* | 7/2020 | D'Souza .......... G06F 11/0772 |
| 2020/0310850 | A1* | 10/2020 | Liguori ............ G06F 9/45558 |
| 2020/0310963 | A1* | 10/2020 | Nilsen ............. G06F 9/5005 |

OTHER PUBLICATIONS

International Searching Authority, PCT/IB2021/057705, dated Nov. 25, 2021.

* cited by examiner

PERFORMING AN APPLICATION SNAPSHOT USING PROCESS VIRTUAL MACHINE RESOURCES

BACKGROUND

The present invention relates generally to a method, system, and computer program product for storing an execution state. More particularly, the present invention relates to a method, system, and computer program product for performing an application snapshot using process virtual machine resources.

A process virtual machine (VM), also called a language runtime, managed language runtime, application virtual machine, or Managed Runtime Environment, runs as a normal application inside a host operating system. A process VM provides a platform-independent environment that hides details of the underlying hardware and operating system from the application running within it, allowing an application to execute, within the process VM, in the same way on any platform. The source code of programs intended for execution in a process VM environment is often compiled into an intermediate representation known as bytecode. Bytecode is not the machine code for any particular computer, and in some implementations is portable between different computer architectures. At runtime, the process VM converts bytecode to machine language instructions for execution by a processor.

Two presently-known examples of a process VM are the Common Language Runtime (CLR) and a Java Virtual Machine (JVM). The CLR, the virtual machine component of the Microsoft .NET framework, manages the execution of .NET programs, which can be written in several different source code languages. (.NET is a registered trademark of Microsoft Corporation in the United States and other countries.) A Java virtual machine (JVM) is a process VM that supports source code written in the Java language as well as other supported source code languages. (Java is a registered trademark of Oracle America, Inc. in the United States and other countries.)

The illustrative embodiments recognize that, in modern cloud computing, servers are typically removed from service when not needed to serve user requests, and returned to service when once again needed. However, the startup time necessary to bring a process VM and application from initial bootup to a full performance level can take more time than is available to respond to demand spikes, resulting in slower-than-expected client service and potentially violating a service level agreement between a service provider and its users.

The illustrative embodiments recognize that speeding up instantiation of a new server instance, including an executing application, can be implemented using a snapshot capability. A snapshot point is a point in the execution flow of an executing application at which the execution state can be stored for restoration in another instance of a process VM. A snapshot is data of a process VM state at the snapshot point, including data relevant to resuming execution from the snapshot point in another instance of the process VM. For example, a snapshot typically includes the contents of virtualized registers and stack of the VM. Once the snapshot is saved, it can be used in another process VM instance to resume execution from the snapshot point by restoring the saved contents in the new instance. Thus, to speed up server instantiation, a process VM and application are instantiated and executed up to a desired execution point, then a snapshot is taken. Then, to create an additional instance of the application, the stored snapshot is restored in the new instance, skipping the original initialization process. As well, multiple instances can be created in parallel from one snapshot, saving additional time.

The illustrative embodiments recognize that flexibility in placing the snapshot point within application execution is important when using snapshotting to speed up server and application instantiation. Applications take time to ramp up from initial bootup to a full performance level. If the snapshot is performed late in application execution, open resources such as files and network connections might not be captured in the snapshot process, resulting in an incorrect restoration. However, a snapshot that has executed long enough to exercise common application code paths as they would be under a full load of client requests has already optimized code in those common code paths and made other adjustments to optimize the application for full performance. Conversely, if the snapshot is performed early in application execution, an incorrect snapshot due to open resources is not a risk, but too much additional code will need to be executed once the application is restored, increasing the time until the new instance is available to respond to client requests. In addition, code that has not yet been executed has also not yet had the opportunity to be profiled and optimized, increasing the time required for the application to reach an optimized performance level. Thus, when implementing snapshotting for a particular application, having the option to experiment with different snapshot points in order to optimize application performance is desirable.

The illustrative embodiments recognize that a snapshot capability can be implemented within source code of an application executing in a process VM. However, implementing the snapshot capability within application source code requires modification of the application source code, adding time and complexity to application development. For example, a snapshot must ensure that the saved address from which execution is to resume is correct In addition, the source code for a particular component in which the snapshot capability is to be implemented may not be available for modification, for security reasons or due to a distribution method of the application.

Consequently, the illustrative embodiments recognize that there is an unmet need for a snapshot capability implementation that can be performed at different points within application execution and does not require modification of the application source code.

SUMMARY

The illustrative embodiments provide a method, system, and computer program product. An embodiment includes a method that registers a snapshot handler with an event monitoring subsystem of a process virtual machine, the registering specifying a trigger event of the snapshot handler, wherein the trigger event comprises execution of a specified portion of an application executing in the process virtual machine, the trigger event specified externally from a source code of the application. An embodiment executes, responsive to the event monitoring subsystem detecting an occurrence of the trigger event, the snapshot handler, execution of the snapshot handler comprising storing data of an execution state of the process virtual machine at a time of occurrence of the trigger event. Thus, the embodiment provides a method for performing an application snapshot using process virtual machine resources.

In another embodiment, the execution state of the process virtual machine at the time of occurrence of the trigger event includes an execution state of the application. Thus, the embodiment provides a particular manner of execution of the snapshot handler.

In another embodiment, the event monitoring subsystem of the process virtual machine comprises a trace capability of a Java Virtual Machine. Thus, the embodiment provides a particular manner of event monitoring subsystem.

In another embodiment, the trigger event comprises execution of an entry to a specified method, the specified method executed by the process virtual machine. Thus, the embodiment provides a particular manner of trigger event triggering execution of the snapshot handler.

In another embodiment, the trigger event comprises execution of an exit from a specified method, the specified method executed by the process virtual machine. Thus, the embodiment provides a particular manner of trigger event triggering execution of the snapshot handler.

In another embodiment, the event monitoring subsystem of the process virtual machine comprises a breakpoint capability of a Java Virtual Machine. Thus, the embodiment provides a particular manner of event monitoring subsystem.

In another embodiment, the trigger event comprises execution of a breakpoint registered with the breakpoint capability, the breakpoint comprising a specified execution location within a method executed by the process virtual machine. Thus, the embodiment provides a particular manner of trigger event triggering execution of the snapshot handler.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
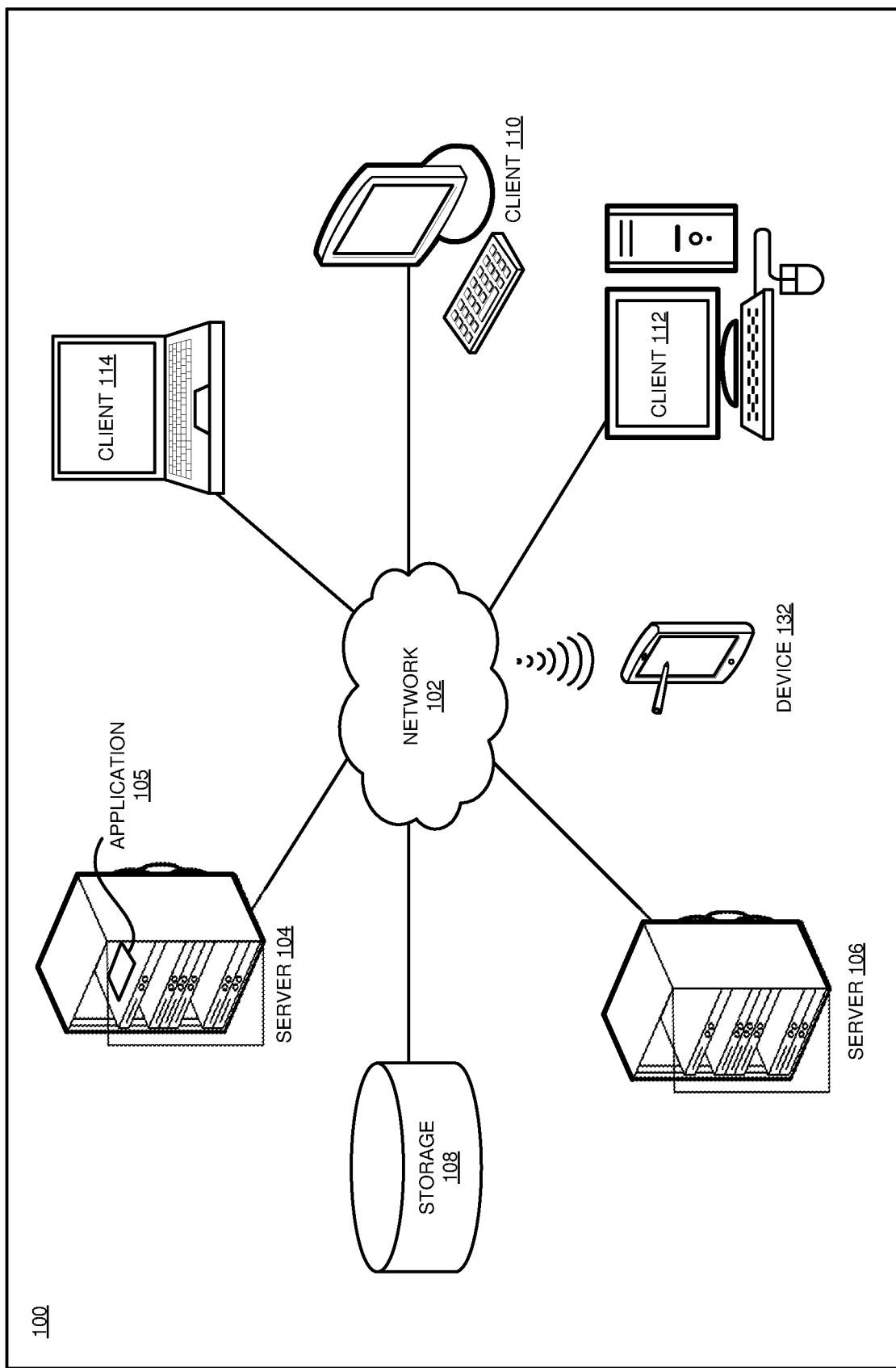
FIG. 1 depicts a block diagram of a network of data processing systems in which illustrative embodiments may be implemented.

The illustrative embodiments recognize that there is an unmet need for a snapshot capability implementation that can be performed at different points within application execution and does not require modification of the application source code. The illustrative embodiments recognize that the presently available tools or solutions do not address these needs or provide adequate solutions for these needs. The illustrative embodiments used to describe the invention generally address and solve the above-described problems and other problems related to performing an application snapshot using process virtual machine resources.

An embodiment can be implemented as a software application. The application implementing an embodiment can be configured as a modification of an existing process VM, as a separate application that operates in conjunction with an existing process VM, a standalone application, or some combination thereof.

Particularly, some illustrative embodiments provide a method that registers a snapshot handler with an event monitoring subsystem of a process VM, including specifying a trigger event of the snapshot handler. Then, responsive to the event monitoring subsystem detecting an occurrence of the trigger event, the snapshot handler is executed to store a snapshot of the process VM, as well as of an application executing in the process VM.

One embodiment uses, as an event monitoring subsystem of a process VM, a trace capability included in a JVM implementation. A trace capability, included in many presently-available JVM implementations, allows an application developer to trace an execution path of parts of an application executing under the JVM, by triggering an event handler when certain events occur during application execution. Some events that can trigger the event handler are entry to and exit from methods executed by application code and VM system code, The event handler, when triggered, stores information about the current VM state. A method, also called a procedure, subroutine, or function, is a block of code which only runs when it is called. In object-oriented computer languages such as Java, methods are declared within classes.

To use the JVM trace capability, an embodiment registers a snapshot handler component with the trace capability, by specifying a trigger event and what is to happen (execute the snapshot handler) when the trigger event occurs. One embodiment registers the snapshot handler by starting the JVM in trace mode, using a command in a configuration file, a command-line parameter, or another technique. For example, one JVM might be started using the example command Xsnapshot: filename=myfile, trigger=HelloWorld.main #entry, indicating that a snapshot event should occur when the method HelloWorld.main is entered, and the snapshot data should be stored in the myfile file. Similarly, the example command Xsnapshot: filename=myfile, trigger=HelloWorld.main #exit indicates that a snapshot event should occur when the method HelloWorld.main is exited, and the snapshot data should be stored in the myfile file. Note that although a method name and file are specified, access to an application's source code is not required to obtain this information. Instead, tools are presently available to extract human readable method names from an application. Thus, an embodiment specifies the trigger event externally from the application, without modifying source code of the application.

Once the embodiment registers the snapshot handler component, the trace capability monitors application execution. One embodiment monitors class loads that occur during application and process VM execution, to determine if the method that will trigger the snapshot handler has been loaded. Once the method has been loaded into memory, it is flagged to trigger the snapshot upon method entry or exit as specified. Then, when the flagged method is entered or exited, the snapshot handler is executed.

Within the snapshot handler, once triggered, an embodiment performs the snapshot, by storing an execution state of the process VM in a predetermined storage location. The stored execution state includes sufficient information to enable the execution state to be restored, and application execution continued from the restore point, in a new process VM instance. For example, to perform the snapshot, one snapshot handler halts execution of all executing application and JVM threads, optionally performs a garbage collection to reduce the number of items to be stored, and serializes and stores objects, classes and class metadata, thread states, monitors and their owners, the garbage collection heap, other JVM metadata, and other portions of the execution state. Note that the saved execution state includes all currently executing processes, not just the method that was the snapshot trigger. Alternatively, an embodiment causes execution of a snapshot handler implemented separately from the embodiment.

Snapshot event triggering using the JVM trace capability is limited to the event monitoring already provided for within the trace capability, namely method entry and exit. In addition, a snapshot implementor must be able to specify the method name and location. However, entry to or exit from a particular method may not be the desired snapshot point, or the method name and location may not be available.

Thus, another embodiment uses, as an event monitoring subsystem of a process VM, a breakpoint capability included in a JVM implementation. A breakpoint capability is included in many presently-available JVM implementations. A non-limiting example of a JVM breakpoint capability uses the JVM Tool Interface (JVMTI), a programming interface that provides both a way to inspect the state and to control the execution of applications running in a JVM. A client of JVMTI, also called an agent, can be triggering when certain events occur during application execution.

To use the JVM breakpoint capability, an embodiment registers a snapshot handler component with the breakpoint capability, by specifying a trigger event and what is to happen (execute the snapshot handler) when the trigger event occurs. One embodiment registers the snapshot handler by starting the JVM in breakpoint mode, using a command in a configuration file, a command-line parameter, or another technique. For example, one JVM might be started using the example command Xsnapshot: filename=myfile, trigger=HelloWorld.main #pc=4, indicating that a snapshot event should occur when thread execution reaches the fourth bytecode in the method HelloWorld.main, and the snapshot data should be stored in the myfile file. Note that although a method name, file, and bytecode offset are specified, access to an application's source code is not required to obtain this information. Instead, tools are presently available to extract human readable method names and bytecode offsets from an application. One example tool is the javap tool included in many JVM implementations. Although referred to herein as the JVM breakpoint capability, any trigger event supported by the JVMTI implementation can be specified instead of a breakpoint. For example, an execution location, method entry and exit, thread start and end, a user generated signal, class load and unload events, and garbage collection events can be specified as a trigger event, allowing the snapshot to be triggered at an arbitrary point or at an event such as a class load or garbage collection that brings the process VM to a particular state. Thus, an embodiment specifies the trigger event externally from the application, without modifying source code of the application.

Once the embodiment registers the snapshot handler component, the breakpoint capability monitors application execution. In particular, if a bytecode location within a method was specified as the trigger event, an embodiment monitors class loads that occur during application and process VM execution, to determine if the method that will trigger the snapshot handler has been loaded. Once the method has been loaded into memory, it is flagged to trigger the snapshot at the specified bytecode location. Then, when execution reaches the specified location, the snapshot handler is executed.

Within the snapshot handler, once triggered using the breakpoint capability, an embodiment performs the snapshot as described herein. Alternatively, an embodiment triggered using the breakpoint capability causes execution of a snapshot handler implemented separately from the embodiment.

Snapshot event triggering using the JVM breakpoint capability is limited to the event monitoring already provided for within the breakpoint capability. However, because the breakpoint capability includes the ability to place a breakpoint anywhere within method execution, using the breakpoint capability allows for more flexible snapshot point placement than when using the trace capability. In addition, an embodiment is implementable using either capability, as availability within a particular JVM implementation permits.

Another embodiment uses, as an event monitoring subsystem of a process VM, a capability included in the process VM. For example, some implementations of the .NET framework include a profiling application program interface (API) that can trigger an event when a method is executed and a debugging API that provides state inspection and execution control for the VM and applications executing within the VM. Other process VMs include similar capabilities.

The manner of performing an application snapshot using process virtual machine resources described herein is unavailable in the presently available methods in the technological field of endeavor pertaining to saving and restoring a state of a currently executing application. A method of an embodiment described herein, when implemented to execute on a device or data processing system, comprises substantial advancement of the functionality of that device or data processing system in registering a snapshot handler with an event monitoring subsystem of a process VM, including specifying a trigger event of the snapshot handler. Then, responsive to the event monitoring subsystem detecting an occurrence of the trigger event, the snapshot handler is executed to store a snapshot of the process VM, as well as of an application executing in the process VM.

The illustrative embodiments are described with respect to certain types of events, event triggers, event handlers, VM capabilities, configurations, commands, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
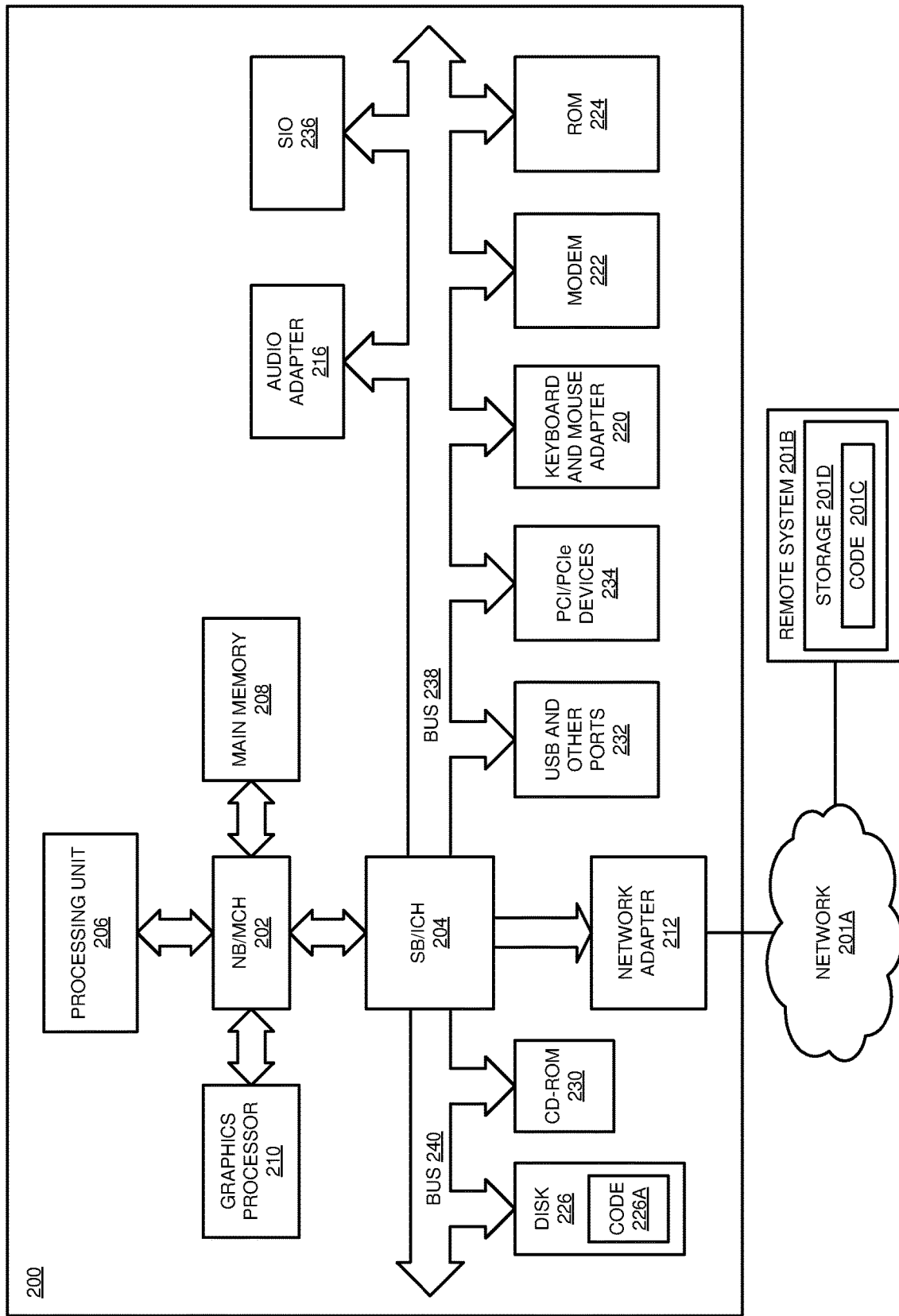
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
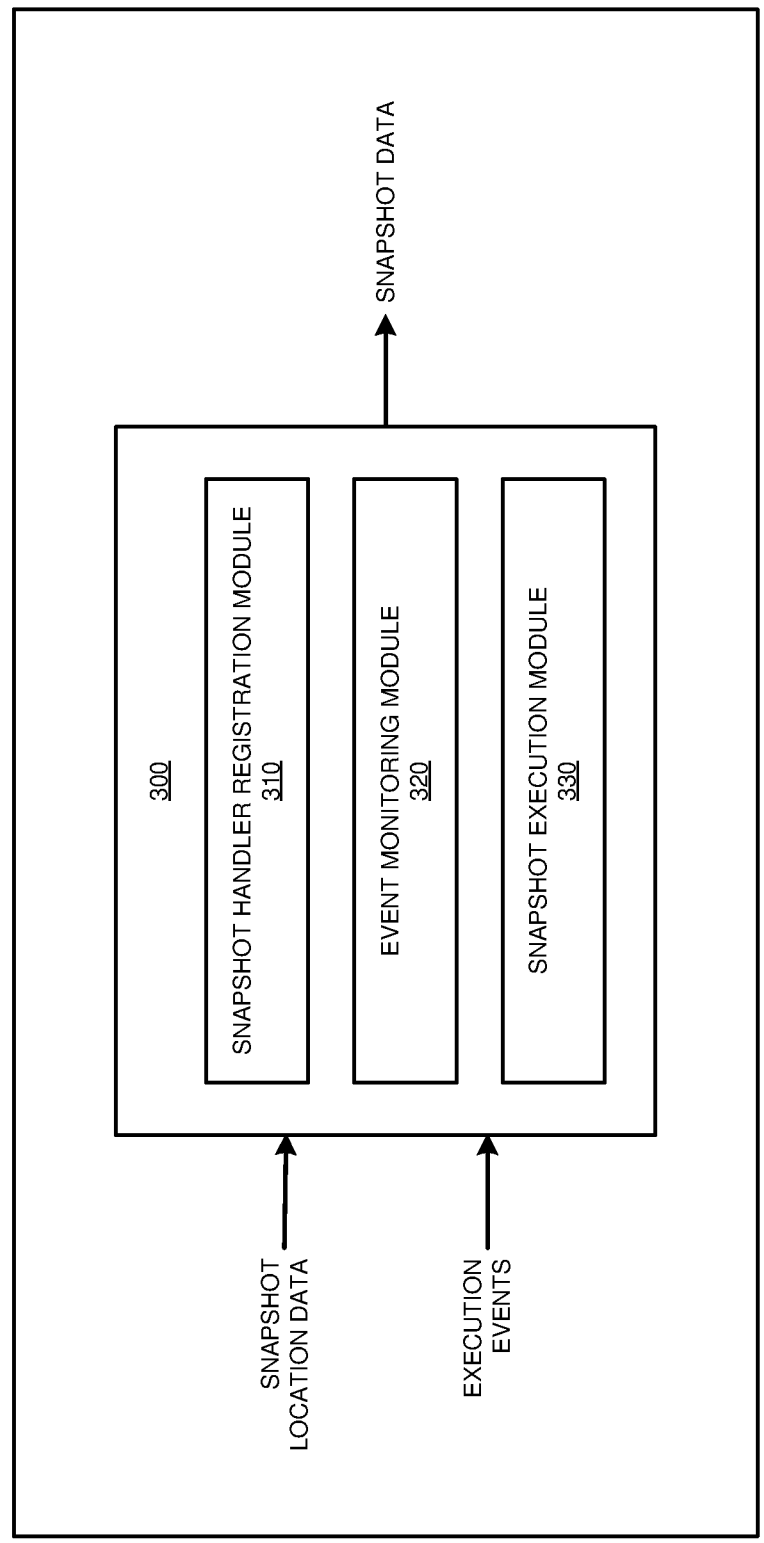
FIG. 3 depicts a block diagram of an example configuration for performing an application snapshot using process virtual machine resources in accordance with an illustrative embodiment.

With reference to FIG. 3, this figure depicts a block diagram of an example configuration for performing an application snapshot using process virtual machine resources in accordance with an illustrative embodiment. Application 300 is an example of application 105 in FIG. 1 and executes in any of servers 104 and 106, clients 110, 112, and 114, and device 132 in FIG. 1.

Application 300 takes, as input, a specified location for a snapshot point and execution event information for a currently executing application and process VM. Application 300 produces snapshot data of the application at the snapshot point, or causes execution of a snapshot handler to produce the snapshot data.

In particular, snapshot handler registration module 310 registers a snapshot handler component with an event monitoring subsystem of a process VM, by specifying a trigger event and what is to happen (execute the snapshot handler) when the trigger event occurs. Once module 310 registers the snapshot handler component, event monitoring module 320 monitors application execution. When the specified trigger event occurs, snapshot execution module 330 executes the snapshot handler, or causes the snapshot handler to be executed.

Figure 4:
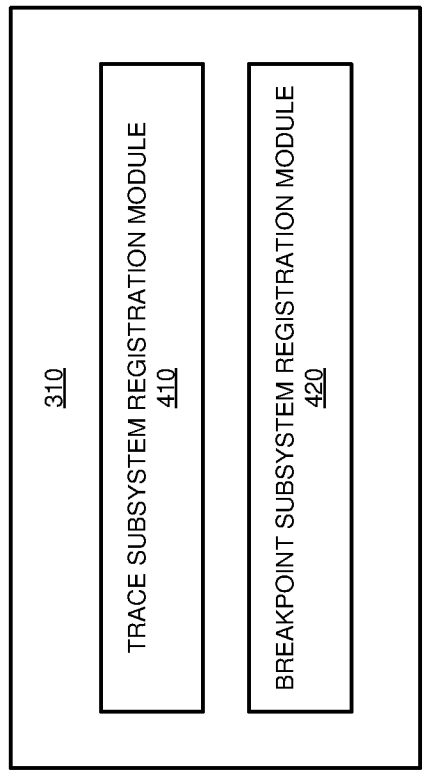
FIG. 4 depicts a block diagram of an example configuration for performing an application snapshot using process virtual machine resources in accordance with an illustrative embodiment.

With reference to FIG. 4, this figure depicts a block diagram of an example configuration for performing an application snapshot using process virtual machine resources in accordance with an illustrative embodiment. In particular, FIG. 4 depicts more detail of snapshot handler registration module 310 in FIG. 3.

To use the JVM trace capability, trace subsystem registration module 410 registers a snapshot handler component with the trace capability, by specifying a trigger event and what is to happen (execute the snapshot handler) when the trigger event occurs. One implementation of module 410 registers the snapshot handler by starting the JVM in trace mode, using a command in a configuration file, a command-line parameter, or another technique. For example, one JVM might be started using the example command Xsnapshot: filename=myfile, trigger=HelloWorld.main #entry, indicating that a snapshot event should occur when the method HelloWorld.main is entered, and the snapshot data should be stored in the myfile file. Similarly, the example command Xsnapshot: filename=myfile, trigger=HelloWorld.main #exit indicates that a snapshot event should occur when the method HelloWorld.main is exited, and the snapshot data should be stored in the myfile file.

To use the JVM breakpoint capability, breakpoint subsystem registration module 420 registers a snapshot handler component with the breakpoint capability, by specifying a trigger event and what is to happen (execute the snapshot handler) when the trigger event occurs. One implementation of module 420 registers the snapshot handler by starting the JVM in breakpoint mode, using a command in a configuration file, a command-line parameter, or another technique. For example, one JVM might be started using the example command Xsnapshot: filename=myfile, trigger=HelloWorld.main #pc=4, indicating that a snapshot event should occur when thread execution reaches the fourth bytecode in the method HelloWorld.main, and the snapshot data should be stored in the myfile file.

Figure 5:
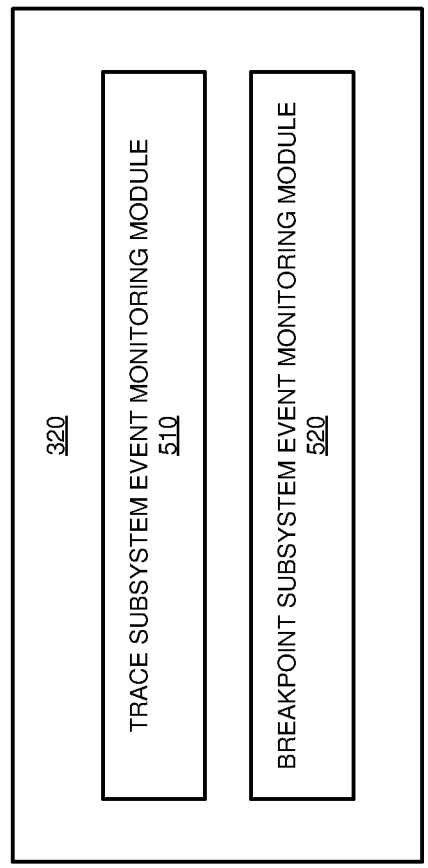
FIG. 5 depicts a block diagram of an example configuration for performing an application snapshot using process virtual machine resources in accordance with an illustrative embodiment.

With reference to FIG. 5, this figure depicts a block diagram of an example configuration for performing an application snapshot using process virtual machine resources in accordance with an illustrative embodiment. In particular, FIG. 5 depicts more detail of event monitoring module 320 in FIG. 3.

Once module 410 registers the snapshot handler component, trace subsystem event monitoring module 510 monitors application execution. One implementation of module 510 monitors class loads that occur during application and process VM execution, to determine if the method that will trigger the snapshot handler has been loaded. Once the method has been loaded into memory, it is flagged to trigger the snapshot upon method entry or exit as specified.

Once module 420 registers the snapshot handler component, breakpoint subsystem event monitoring module 520 monitors application execution. In one implementation of module 520, if a bytecode location within a method was specified as the trigger event, module 520 monitors class loads that occur during application and process VM execution, to determine if the method that will trigger the snapshot handler has been loaded. Once the method has been loaded into memory, it is flagged to trigger the snapshot at the specified bytecode location.

Figure 6:
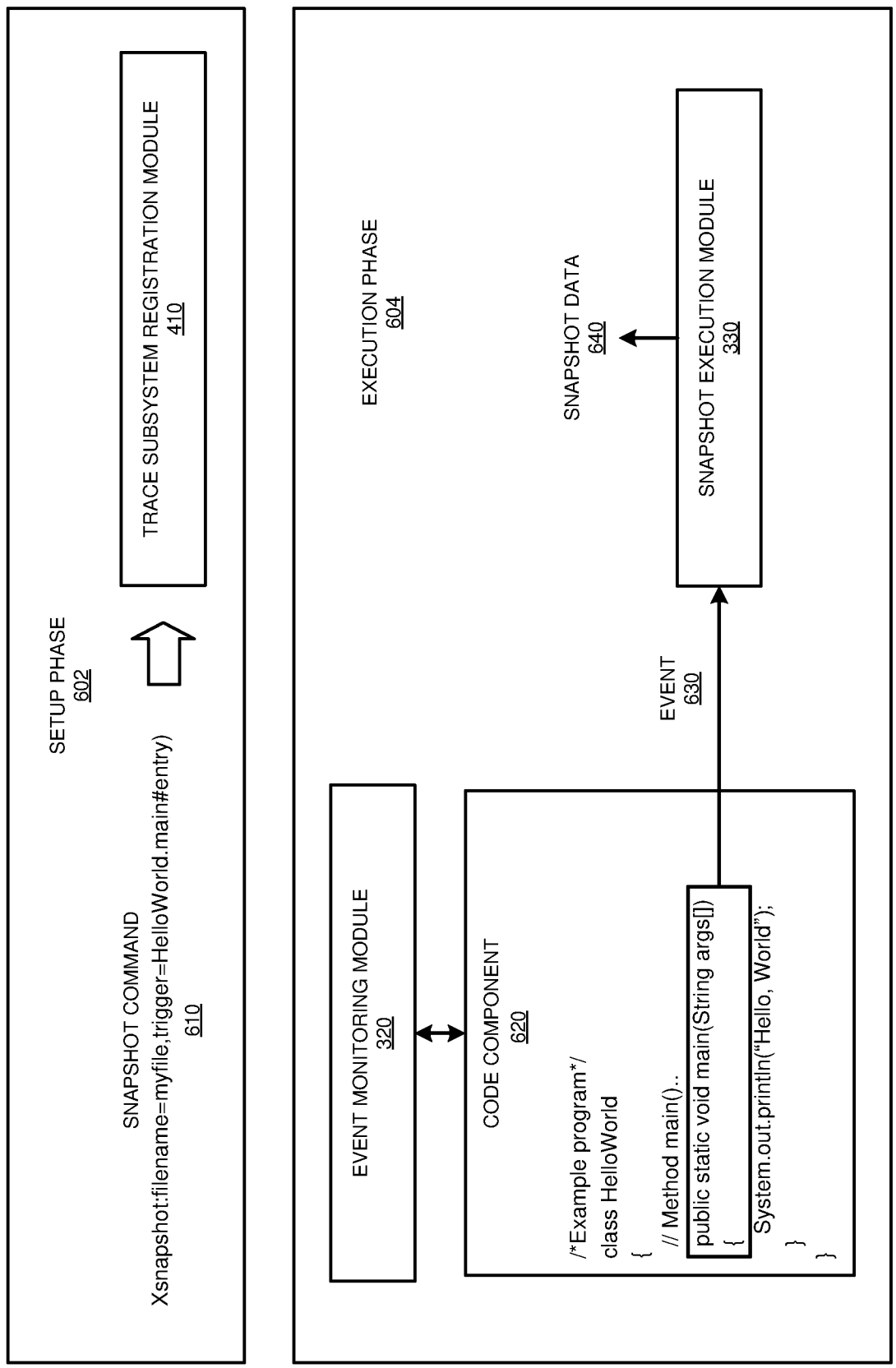
FIG. 6 depicts an example of performing an application snapshot using process virtual machine resources in accordance with an illustrative embodiment.

With reference to FIG. 6, this figure depicts an example of performing an application snapshot using process virtual machine resources in accordance with an illustrative embodiment. The example can be executed using application 300 in FIG. 3. Event monitoring module 320 and snapshot execution module 330 are the same as event monitoring module 320 and snapshot execution module 330 in FIG. 3. Trace subsystem registration module 410 is the same as trace subsystem registration module 410 in FIG. 4.

In setup phase 602, application 300 uses snapshot command 610 and trace subsystem registration module 410 to register a snapshot handler component with the trace capability. Snapshot command 610 specifies a trigger event (entry to the method HelloWorld.main, in the myfile file) and what is to happen (execute the snapshot handler) when the trigger event occurs.

Then, in execution phase 604, event monitoring module 320 monitors execution of a process VM and an application executing in the VM, which includes code component 620. Code component 620 includes the method HelloWorld.main, in the myfile file. Thus, when execution enters the HelloWorld.main method, event 630 is triggered, and snapshot execution module 330 generates snapshot data 640.

Figure 7:
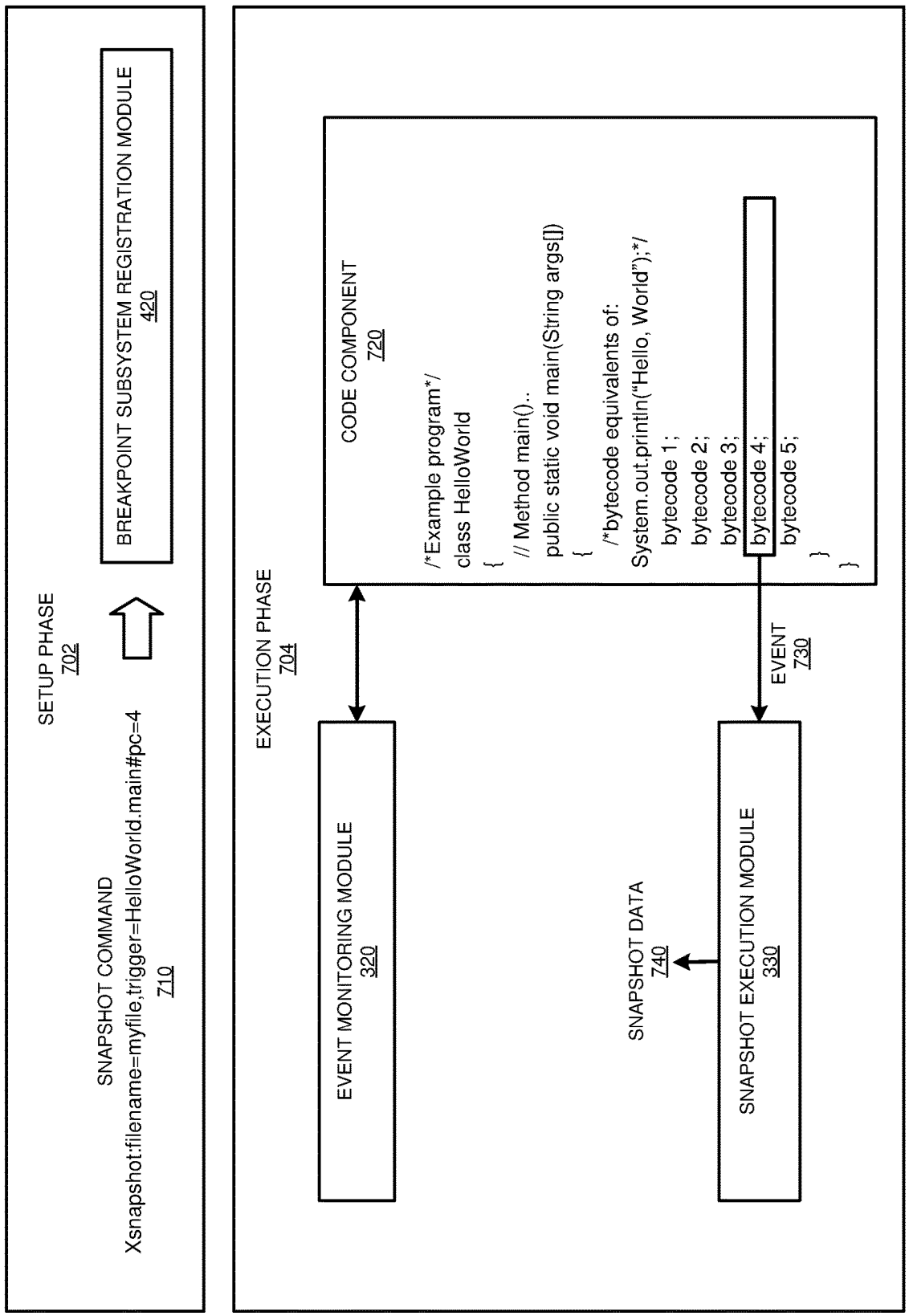
FIG. 7 depicts an example of performing an application snapshot using process virtual machine resources in accordance with an illustrative embodiment.

With reference to FIG. 7, this figure depicts an example of performing an application snapshot using process virtual machine resources in accordance with an illustrative embodiment. The example can be executed using application 300 in FIG. 3. Event monitoring module 320 and snapshot execution module 330 are the same as event monitoring module 320 and snapshot execution module 330 in FIG. 3. Breakpoint subsystem registration module 420 is the same as breakpoint subsystem registration module 420 in FIG. 4.

In setup phase 702, application 300 uses snapshot command 710 and breakpoint subsystem registration module 420 to register a snapshot handler component with the trace capability. Snapshot command 710 specifies a trigger event (the fourth bytecode in the method HelloWorld.main, in the myfile file) and what is to happen (execute the snapshot handler) when the trigger event occurs.

Then, in execution phase 704, event monitoring module 320 monitors execution of a process VM and an application executing in the VM, which includes code component 720. Code component 720 includes the method HelloWorld.main, in the myfile file, and five bytecodes within the method. Thus, when execution reaches the fourth bytecode in the HelloWorld.main method, event 730 is triggered, and snapshot execution module 330 generates snapshot data 740.

Figure 8:
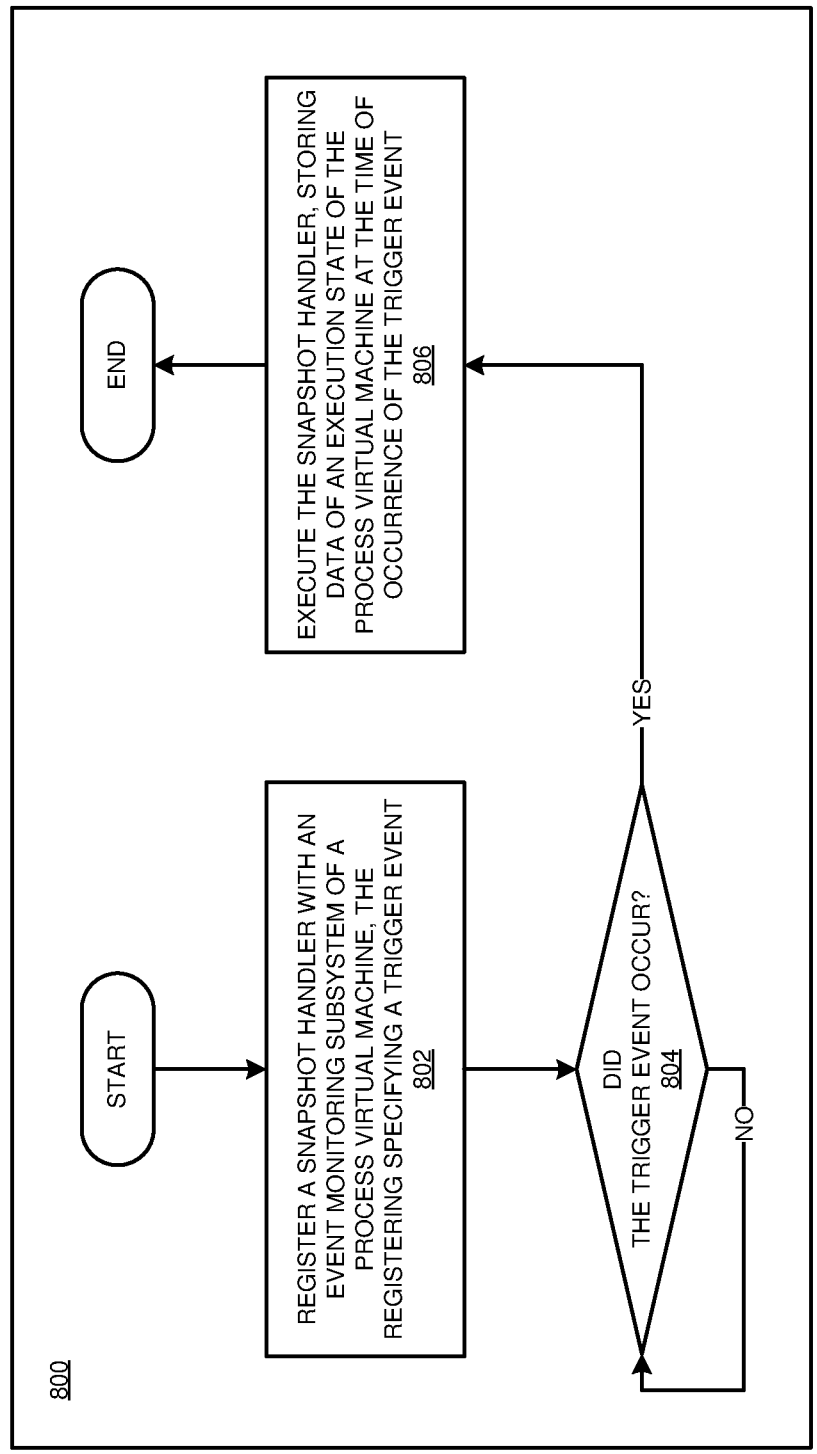
FIG. 8 depicts a flowchart of an example process for performing an application snapshot using process virtual machine resources in accordance with an illustrative embodiment.

With reference to FIG. 8, this figure depicts a flowchart of an example process for performing an application snapshot using process virtual machine resources in accordance with an illustrative embodiment. Process 800 can be implemented in application 300 in FIG. 3.

In block 802, the application registers a snapshot handler with an event monitoring subsystem of a process virtual machine, the registering specifying a trigger event. In block 804, the application determines whether the trigger event occurred. If not ("NO" path of block 804), the application stays at block 804. When the trigger event occurs ("YES" path of block 804), in block 806 the application executes the snapshot handler, storing data of an execution state of the process virtual machine at the time of occurrence of the trigger event. Then the application ends.

Figure 9:
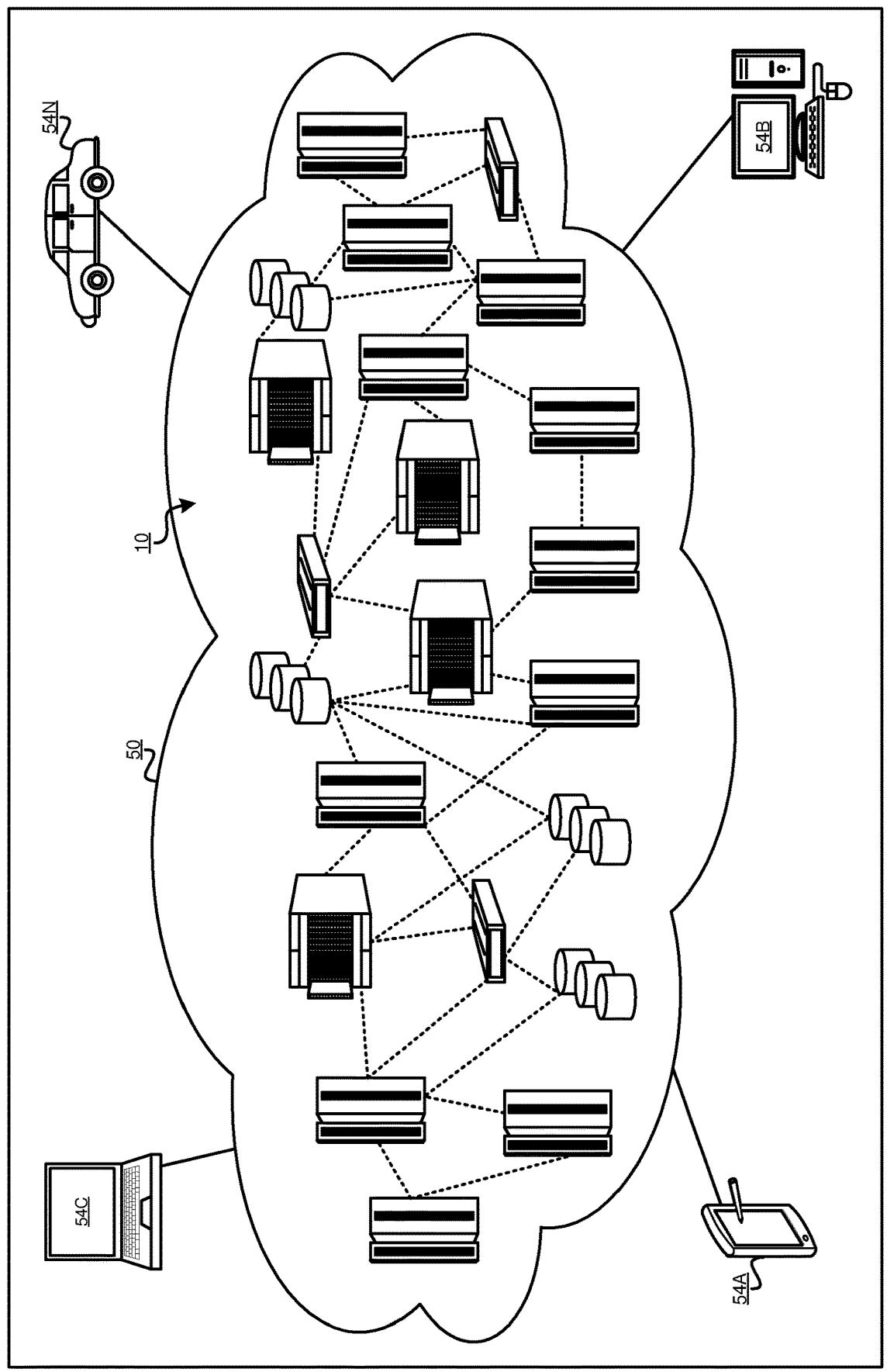
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 10:
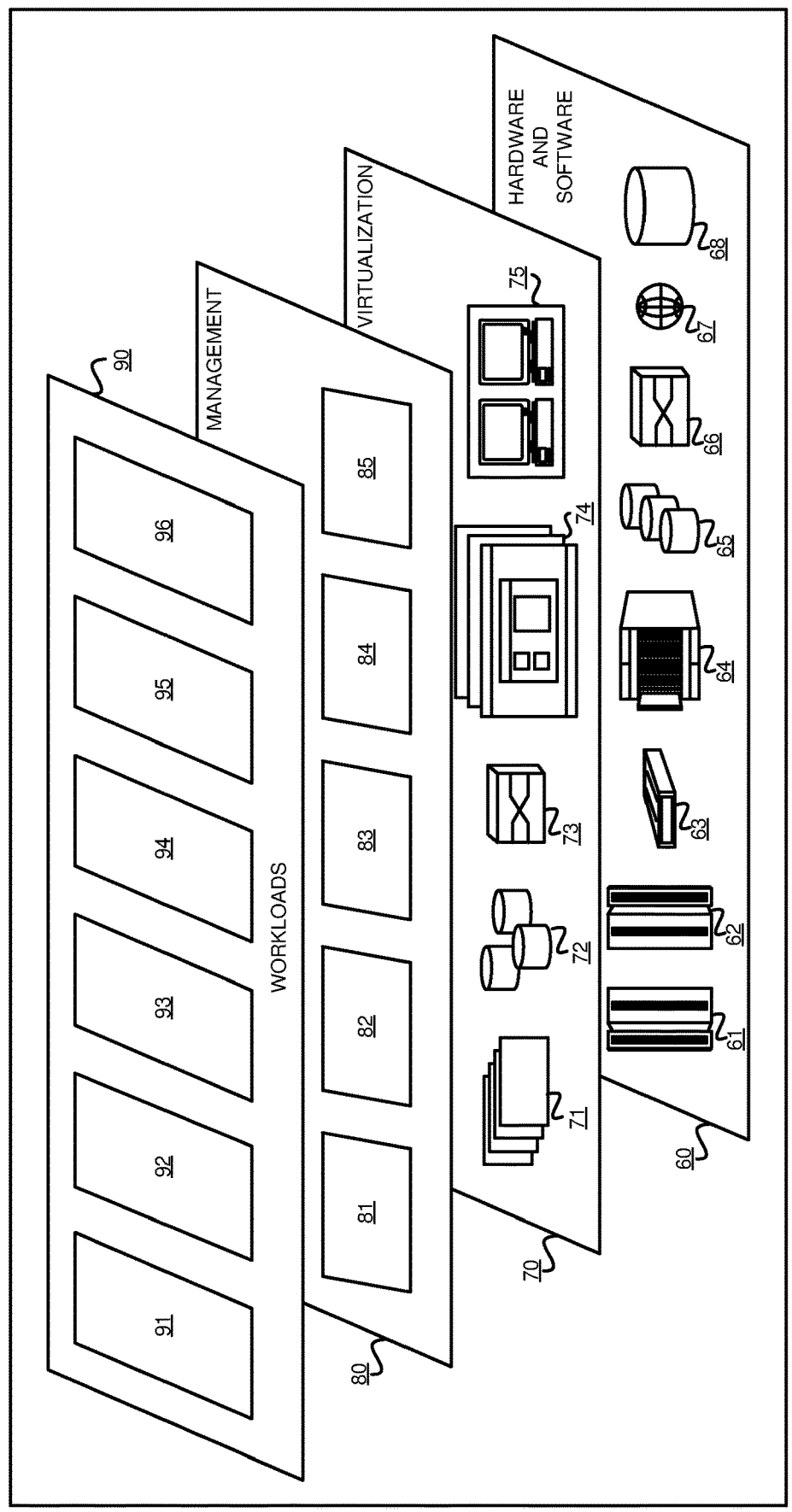
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for performing an application snapshot using process virtual machine resources and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
registering a snapshot handler with an event monitoring subsystem of a process virtual machine, the registering specifying a trigger event of the snapshot handler, wherein the trigger event comprises execution of a specified portion of an application executing in the process virtual machine, the trigger event specified as an initialization parameter of the process virtual machine; and
executing, responsive to the event monitoring subsystem detecting an occurrence of the trigger event, the snapshot handler, execution of the snapshot handler comprising storing data of an execution state of the process virtual machine at a time of occurrence of the trigger event.

2. The computer-implemented method of claim 1, wherein the execution state of the process virtual machine at the time of occurrence of the trigger event includes an execution state of the application.

3. The computer-implemented method of claim 1, wherein the event monitoring subsystem of the process virtual machine comprises a trace capability of a Java Virtual Machine.

4. The computer-implemented method of claim 3, wherein the trigger event comprises execution of an entry to a specified method, the specified method executed by the process virtual machine.

5. The computer-implemented method of claim 3, wherein the trigger event comprises execution of an exit from a specified method, the specified method executed by the process virtual machine.

6. The computer-implemented method of claim 1, wherein the event monitoring subsystem of the process virtual machine comprises a breakpoint capability of a Java Virtual Machine.

7. The computer-implemented method of claim 6, wherein the trigger event comprises execution of a breakpoint registered with the breakpoint capability, the breakpoint comprising a specified execution location within a method executed by the process virtual machine.

8. A computer program product for performing an application snapshot using process virtual machine resources, the computer program product comprising:
one or more computer readable storage media, and program instructions collectively stored on the one or more computer readable storage media, the program instructions comprising:
program instructions to register a snapshot handler with an event monitoring subsystem of a process virtual machine, the registering specifying a trigger event of the snapshot handler, wherein the trigger event comprises execution of a specified portion of an application executing in the process virtual machine, the trigger event specified as an initialization parameter of the process virtual machine; and
program instructions to execute, responsive to the event monitoring subsystem detecting an occurrence of the trigger event, the snapshot handler, execution of the snapshot handler comprising storing data of an execution state of the process virtual machine at a time of occurrence of the trigger event.

9. The computer program product of claim 8, wherein the execution state of the process virtual machine at the time of occurrence of the trigger event includes an execution state of the application.

10. The computer program product of claim 8, wherein the event monitoring subsystem of the process virtual machine comprises a trace capability of a Java Virtual Machine.

11. The computer program product of claim 10, wherein the trigger event comprises execution of an entry to a specified method, the specified method executed by the process virtual machine.

12. The computer program product of claim 10, wherein the trigger event comprises execution of an exit from a specified method, the specified method executed by the process virtual machine.

13. The computer program product of claim 8, wherein the event monitoring subsystem of the process virtual machine comprises a breakpoint capability of a Java Virtual Machine.

14. The computer program product of claim 13, wherein the trigger event comprises execution of a breakpoint registered with the breakpoint capability, the breakpoint comprising a specified execution location within a method executed by the process virtual machine.

15. The computer program product of claim 8, wherein the stored program instructions are stored in the at least one of the one or more storage media of a local data processing system, and wherein the stored program instructions are transferred over a network from a remote data processing system.

16. The computer program product of claim 8, wherein the stored program instructions are stored in the at least one of the one or more storage media of a server data processing system, and wherein the stored program instructions are downloaded over a network to a remote data processing system for use in a computer readable storage device associated with the remote data processing system.

17. The computer program product of claim 8, wherein the computer program product is provided as a service in a cloud environment.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to register a snapshot handler with an event monitoring subsystem of a process virtual machine, the registering specifying a trigger event of the snapshot handler, wherein the trigger event comprises execution of a specified portion of an application executing in the process virtual machine, the trigger event specified as an initialization parameter of the process virtual machine; and
program instructions to execute, responsive to the event monitoring subsystem detecting an occurrence of the trigger event, the snapshot handler, execution of the snapshot handler comprising storing data of an execution state of the process virtual machine at a time of occurrence of the trigger event.

19. The computer system of claim 18, wherein the execution state of the process virtual machine at the time of occurrence of the trigger event includes an execution state of the application.

20. The computer system of claim 18, wherein the event monitoring subsystem of the process virtual machine comprises a trace capability of a Java Virtual Machine.

21. The computer system of claim 20, wherein the trigger event comprises execution of an entry to a specified method, the specified method executed by the process virtual machine.

22. The computer system of claim 20, wherein the trigger event comprises execution of an exit from a specified method, the specified method executed by the process virtual machine.

23. The computer system of claim 18, wherein the event monitoring subsystem of the process virtual machine comprises a breakpoint capability of a Java Virtual Machine.

24. A cloud environment, comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to register a snapshot handler with an event monitoring subsystem of a process virtual machine, the registering specifying a trigger event of the snapshot handler, wherein the trigger event comprises execution of a specified portion of an application executing in the process virtual machine, the trigger event specified as an initialization parameter of the process virtual machine; and
program instructions to execute, responsive to the event monitoring subsystem detecting an occurrence of the trigger event, the snapshot handler, execution of the snapshot handler comprising storing data of an execution state of the process virtual machine at a time of occurrence of the trigger event.

25. A memory management subsystem, comprising:
a memory controller;
a memory manager, the memory manager configured to cause the memory controller to perform operations comprising:
registering a snapshot handler with an event monitoring subsystem of a process virtual machine, the registering specifying a trigger event of the snapshot handler, wherein the trigger event comprises execution of a specified portion of an application executing in the process virtual machine, the trigger event specified as an initialization parameter of the process virtual machine; and executing, responsive to the event monitoring subsystem detecting an occurrence of the trigger event, the snapshot handler, execution of the snapshot handler comprising storing data of an execution state of the process virtual machine at a time of occurrence of the trigger event.

* * * * *